(12) United States Patent
Kim

(10) Patent No.: US 10,482,412 B2
(45) Date of Patent: Nov. 19, 2019

(54) SYSTEM AND METHOD FOR PROVIDING PRODUCT DELIVERY SERVICE IN ELECTRONIC TRANSACTION USING SMARTPHONE

(71) Applicant: EBAY KOREA CO., LTD., Seoul (KR)

(72) Inventor: Phil Jae Kim, Seoul (KR)

(73) Assignee: eBay Inc., San Jose, CA (US)

( * ) Notice: Subject to any disclaimer, the term of this patent is extended or adjusted under 35 U.S.C. 154(b) by 418 days.

(21) Appl. No.: 15/105,978

(22) PCT Filed: Dec. 15, 2014

(86) PCT No.: PCT/KR2014/012329
§ 371 (c)(1),
(2) Date: Jun. 17, 2016

(87) PCT Pub. No.: WO2015/093798
PCT Pub. Date: Jun. 25, 2015

(65) Prior Publication Data
US 2016/0321601 A1    Nov. 3, 2016

(30) Foreign Application Priority Data

Dec. 17, 2013 (KR) .......................... 10-2013-0157420

(51) Int. Cl.
*G06Q 30/00* (2012.01)
*G06Q 10/08* (2012.01)
(Continued)

(52) U.S. Cl.
CPC ......... *G06Q 10/083* (2013.01); *G06K 7/1413* (2013.01); *G06Q 10/0836* (2013.01); *G06Q 30/0635* (2013.01)

(58) Field of Classification Search
CPC .............. G06Q 30/06; G06Q 30/0601; G06Q 30/0643; G06Q 10/08; G06Q 10/083; G06Q 10/0832; G06Q 10/08355; G06Q 10/0836
See application file for complete search history.

(56) References Cited

U.S. PATENT DOCUMENTS

| 2008/0201155 A1* | 8/2008 | Som ........................ A47F 10/00 705/1.1 |
| 2008/0308356 A1* | 12/2008 | Spiro ..................... G06Q 30/06 186/57 |

(Continued)

FOREIGN PATENT DOCUMENTS

| AU | 2014367579 B2 | 6/2015 |
| CN | 101727631 A | 6/2010 |

(Continued)

OTHER PUBLICATIONS

Amazon, 7-Eleven team up to bring delivery convenience to your corner store. Joseph Volpe. Sep. 4, 2011. (Year: 2011).*

(Continued)

*Primary Examiner* — William J Allen
(74) *Attorney, Agent, or Firm* — Schwegman Lundberg & Woessner, P.A.

(57) ABSTRACT

Provided are a system and method for providing a product delivery service in an electronic transaction using a smartphone in which delivery product discharging devices are suitably disposed in specific places of main areas such as a subway station or a bus stop and a purchaser may conveniently pick up an ordered delivery product from a delivery product discharging device previously designated by the purchaser using a smartphone of the purchaser.

20 Claims, 2 Drawing Sheets

(51) Int. Cl.
*G06K 7/14* (2006.01)
*G06Q 30/06* (2012.01)

(56) References Cited

U.S. PATENT DOCUMENTS

2014/0279191 A1* 9/2014 Agarwal ............ G06Q 30/0633
705/26.7
2014/0379529 A1* 12/2014 Agasti ................ G06Q 30/0635
705/26.81

FOREIGN PATENT DOCUMENTS

| | | | |
|---|---|---|---|
| CN | 101751634 | A | 6/2010 |
| CN | 101944221 | A | 1/2011 |
| CN | 103065170 | A | 4/2013 |
| CN | 102779300 | A | 11/2014 |
| CN | 105981071 | A | 9/2016 |
| KR | 1020110117392 | A | 10/2011 |
| KR | 101261189 | B1 | 5/2013 |
| KR | 101307239 | B1 | 10/2013 |
| KR | 1020130127585 | A | 11/2013 |
| WO | WO-2015093798 | A1 | 6/2015 |

OTHER PUBLICATIONS

"International Application Serial No. PCT/KR2014/012329, International Search Report dated Mar. 13, 2015", with English translation, 5 pgs.
"International Application Serial No. PCT/KR2014/012329, Written Opinion dated Mar. 13, 2015", with English translation, 8 pgs.
"Korean Application Serial No. 10-2013-0157420, Office Action dated Jan. 20, 2015", with English translation of claims, 8 pgs.
"Korean Application Serial No. 10-2013-0157420, Response filed Feb. 17, 2015 to Office Action dated Jan. 20, 2015", with English translation of claims, 28 pgs.
"Australian Application Serial No. 2014367579, First Examiners Report dated Nov. 30, 2016", 3 pgs.
"Australian Application Serial No. 2014367579, Response to First Examiners Report dated Jun. 20, 2017", 21 pgs.
"Canadian Application Serial No. 2,933,036, Office Action dated Apr. 19, 2017", 3 pgs.
Office Action received for Canadian Patent Application No. 2,933,036, dated Mar. 28, 2018, 5 pages.
Response to Office Action filed Oct. 17, 2017 for Canadian Patent Application No. 2,933,036, dated Apr. 19, 2017, 25 pages.
International Preliminary Report on Patentability received for PCT Patent Application No. PCT/KR2014/012329, dated Jun. 30, 2016, 18 pages (12 pages of English Translation and 6 pages of Official Copy).
Response to Office Action filed on Sep. 25, 2018, for Canada Patent Application No. 2,933,036, dated Mar. 28, 2018, 10 pages.
Response to Office Action filed on Apr. 25, 2019, for Chinese Patent Application No. 201480074988.4, dated Dec. 18, 2018, 9 pages (3 pages of English Translation and 6 pages of Official Copy).
"Chinese Application No. 201480074988.4, Decision of Rejection dated Jul. 12, 2019", (5 pages original copy, 8 pages English translation).

* cited by examiner

SYSTEM AND METHOD FOR PROVIDING PRODUCT DELIVERY SERVICE IN ELECTRONIC TRANSACTION USING SMARTPHONE

This application is a U.S. National Stage Filing under 35 U.S.C. 371 from International Application No. PCT/KR2014/012329, filed on 15 Dec. 2014, and published as WO 2015/093798 A1 on 25 Jun. 2015, which claims the benefit of Korean Application Serial No. 10-2013-0157420, filed on Dec. 17, 2013, which applications and publication are incorporated by reference herein in their entirety.

BACKGROUND

1. Technical Field

Example embodiments of the present invention relate in general to a system and method for providing a product delivery service in an electronic transaction using a smartphone and more specifically to a system and method for providing a product delivery service in an electronic transaction using a smartphone in which delivery product discharging devices are suitably disposed in specific places of main areas such as a subway station or a bus stop and a purchaser may conveniently take an ordered delivery product from a delivery product discharging device previously designated by the purchaser using a smartphone of the purchaser.

2. Related Art

Recently, along with the rapid development of the Internet, electronic transactions, in which products are purchased on-line, increase day by day. Electronic transactions are being increasingly applied to various products including daily necessities, housewares, and electronics.

Such development of electronic transactions has been a result of the development of communication networks as well as the provision of other benefits that cannot be obtained by sellers and purchasers through traditional transaction systems.

That is, advantageously, sellers need not maintain a shop or a separate large warehouse for storing products, and thereby saves funds on facilities and can reflect this in product prices, while the purchasers may shop conveniently and at lower prices without needing to visit a shop.

That is, an electronic transaction is the sale or purchase of goods or services, a portion or all of which is electronically processed, for example, through an exchange of electronic documents.

Similarly to transactions made in the real world, all participants in the transaction participate in the electronic transaction. In the simplest electronic transaction, the participants in the electronic transaction include a cyber mall that provides goods or services, a consumer that purchases goods or services from the cyber mall, and a virtual bank or a credit card company that handles any money transactions for products.

In a process of the electronic transaction, first, a consumer accesses a cyber mall using a terminal connected to the Internet, such as a computer, and then shops. The consumer finds a desired product, delivers a purchase decision to the cyber mall, and provides a payment means such as a credit card number or a password.

The cyber mall verifies the credit card number and password that are presented by the customer with the virtual bank or the credit card company, and requests payment of the purchase price. When the virtual bank or credit card company gives the payment to the cyber mall, the cyber mall delivers the product to the customer, thereby completing the purchase process.

However, in a typical system for processing delivery of a product that is ordered in an electronic transaction, the purchaser feels inconvenience because he/she has to wait three to five days to receive the ordered product.

Accordingly, an office worker who lives alone needs a product delivery service system in which he/she can and quickly pick up the ordered product while passing by a subway station, etc. near his/her office.

SUMMARY

Accordingly, example embodiments of the present invention are provided to substantially obviate one or more problems due to limitations and disadvantages of the related art.

Example embodiments of the present invention provide a system and method for providing a product delivery service in an electronic transaction using a smartphone in which delivery product discharging devices are suitably disposed in specific places of main areas such as a subway station or a bus stop and a purchaser may conveniently take an ordered delivery product from a delivery product discharging device previously designated by the purchaser using a smartphone of the purchaser.

In some example embodiments, a system for providing a product delivery service through an electronic transaction using a smartphone, the system includes: at least one smartphone configured to perform a shopping-mall-related application service; a shopping mall server configured to generate a unique product barcode provided to purchase a product registered through a seller terminal using the shopping-mall-related application service, the unique product barcode including order-related information for the purchased product, and collect, from a seller of the purchased product, delivery products all at once, the delivery products being processed for delivery by attaching unique product barcodes thereto, to perform a classification and delivery processing service by delivery destination using the unique product barcodes; and at least one delivery product discharging device installed in a specific place and configured to scan the unique product barcodes of the delivery products processed for delivery by the shopping mall server, transmit order-related information of each delivery product to the shopping mall server, and discharge the delivery product of the purchaser through the shopping-mall-related application service, wherein the shopping mall server receives the order-related information of the delivery products transmitted from the delivery product discharging device and transmits a delivery completion message to a purchaser smartphone of each delivery product, the purchaser smartphone transmits location information of the purchaser to the shopping mall server using the shopping-mall-related application service, and the shopping mall server transmits a discharging ready signal of the purchaser delivery product to a delivery product discharging device designated by the purchaser using the location information of the purchaser transmitted from the purchaser smartphone when the purchaser approaches the designated delivery product discharging device.

The unique product barcode may include order-related information including a member ID of a purchaser, a unique device number of the delivery product discharging device selected by the purchaser, and a product order number.

The shopping mall server may receive the order-related information of the delivery products transmitted from each delivery product discharging device to transmit a delivery completion message to the shopping-mall-related application installed in the purchaser smartphone of the delivery product in a push type or transmit the delivery completion message to a purchaser-member-related webpage provided in a specific webpage operated by the shopping mall server.

The smartphone may check GPS information of the smartphone through the shopping-mall-related application service to periodically transmit location information of the purchaser to the shopping mall server.

Each delivery product discharging device may transmit a specific beacon signal to the shopping-mall-related application installed in the purchaser smartphone, and transmit the location information of the purchaser to the shopping mall server based on the transmitted specific beacon signal through the shopping-mall-related application service.

The purchaser smartphone may sense whether the purchaser approaches the delivery product discharging device designated by the purchaser through the shopping-mall-related application installed in the smartphone, display a discharging message for the delivery product purchased by the purchaser on a screen thereof when the purchaser approaches the delivery product discharging device designated by the purchaser, and transmit location and identification information of the purchaser to the shopping mall server when the purchaser requires that the delivery product be discharged, and the shopping mall server may receive the location and identification information of the purchaser transmitted from the smartphone to transmit a delivery product number of the purchaser and a discharging instruction to the delivery product discharging device designated by the purchaser to discharge the delivery product of the purchaser.

The delivery product discharging device designated by the purchaser may receive the delivery product number of the purchaser and the discharging instruction transmitted from the shopping mall server to provide a service for discharging the delivery product of the purchaser and transmit a delivery completion signal to the shopping mall server after completion of discharging the delivery product, and the shopping mall server may receive the delivery completion signal transmitted from the delivery product discharging device designated by the purchaser to transmit the delivery completion confirmation message to the purchaser smartphone.

The purchaser smartphone may transmit the location information of the purchaser to the delivery product discharging device designated by the purchaser using the shopping mall-related application service of the smartphone, and the delivery product discharging device designated by the purchaser may periodically receive the location information of the purchaser transmitted from the purchaser smartphone and perform discharging preparation by computing a moving time for each means of transport and determining an order in which the delivery products are discharged such that the delivery product of the purchaser that arrives at the delivery product discharging device in a shortest time.

The system may further include at least one Bluetooth transmitter installed a certain distance from each delivery product discharging device and configured to output a specific beacon signal, in which, when the specific beacon signal output from the Bluetooth transmitter is sensed through the shopping-mall-related application service of the smartphone, the purchaser smartphone transmits detailed location information of the purchaser to the delivery product discharging device designated by the purchaser and the shopping mall server.

The delivery product discharging device may be installed in a specific place in a subway station or a bus stop.

In other example embodiments, a method of providing a product delivery service through an electronic transaction using a system including a smartphone connected with a shopping mall and at least one delivery product discharging device over a communication network, the method includes steps of: (a) purchasing a product registered through a seller terminal using a shopping-mall-related application service installed in the smartphone; (b) generating a unique product barcode including order-related information of the product purchased in step (a) through the shopping mall server and collecting, from a seller of the purchased product, delivery products all at once, the delivery products being processed for delivery by attaching unique product barcodes thereto, to perform a classification and delivery processing service by delivery destination using the unique product barcodes; (c) scanning the unique product barcodes of the delivery products processed for delivery in step (b) through the delivery product discharging device to transmit order-related information of the respective delivery products to the shopping mall server; (d) receiving the order-related information of the delivery products transmitted in step (c) through the shopping mall server to transmit a delivery completion message to a purchaser smartphone of each delivery product; (e) transmitting location information of the purchaser to the shopping mall server using the shopping-mall-related application service through the shopping-mall-related application service installed in the smartphone; (f) transmitting a discharging ready signal of the purchaser delivery product to a delivery product discharging device designated by the purchaser through the shopping mall server using the location information of the purchaser transmitted in step (e) when the purchaser approaches the designated delivery product discharging device; and (g) providing a service for allowing the delivery product discharging device designated by the purchaser to discharge the delivery product of the purchaser through the shopping-mall-related application service installed in the smartphone.

In step (b), the unique product barcode may include order-related information including a member ID of the purchaser, a unique device number of the delivery product discharging device selected by the purchaser, and a product order number.

In step (d), the shopping mall server may receive the order-related information of the delivery products transmitted from each delivery product discharging device to transmit a delivery completion message to the shopping-mall-related application installed in the purchaser smartphone of the delivery product in a push type or transmit the delivery completion message to a purchaser-member-related webpage provided in a specific webpage operated by the shopping mall server.

In step (e), the smartphone may check GPS information of the smartphone through the shopping-mall-related application service to periodically transmit location information of the purchaser to the shopping mall server.

In step (e), each delivery product discharging device may transmit a specific beacon signal to the shopping-mall-related application installed in the purchaser smartphone, and transmit the location information of the purchaser to the shopping mall server based on the transmitted specific beacon signal through the shopping-mall-related application service.

In step (g), the purchaser smartphone may sense whether the purchaser approaches the delivery product discharging device designated by the purchaser through the shopping-mall-related application installed in the smartphone, display a discharging message for the delivery product purchased by the purchaser on a screen thereof when the purchaser approaches the delivery product discharging device designated by the purchaser, and transmit location and identification information of the purchaser to the shopping mall server when the purchaser requires that the delivery product be discharged, and the shopping mall server may transmit a delivery product number of the purchaser and a discharging instruction to the delivery product discharging device designated by the purchaser to discharge the delivery product of the purchaser using the location and identification information of the purchaser transmitted from the smartphone.

The delivery product discharging device designated by the purchaser may provide a service for discharging the delivery product of the purchaser using the delivery product number of the purchaser and the discharging instruction transmitted from the shopping mall and transmit a delivery completion signal to the shopping mall server after completion of discharging the delivery product, and the shopping mall server may transmit the delivery completion confirmation message to the purchaser smartphone based on the delivery completion signal transmitted from the delivery product discharging device designated by the purchaser.

The method may further include, after step (d), transmitting the location information of the purchaser to the delivery product discharging device designated by the purchaser using the shopping-mall-related application service of the smartphone, periodically receiving the location information of the purchaser transmitted from the purchaser smartphone through the delivery product discharging device designated by the purchaser, and performing discharging preparation by computing a moving time for each means of transport and determining an order in which the delivery products are discharged such that the delivery product of the purchaser that arrives at the delivery product discharging device in a shortest time is discharged first.

At least one Bluetooth transmitter for outputting a specific beacon signal may be installed a certain distance from each delivery product discharging device, and when the specific beacon signal output from the Bluetooth transmitter is sensed through the shopping-mall-related application service of the smartphone, the purchaser smartphone may transmit detailed location information of the purchaser to the delivery product discharging device designated by the purchaser and the shopping mall server.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Figure 1:
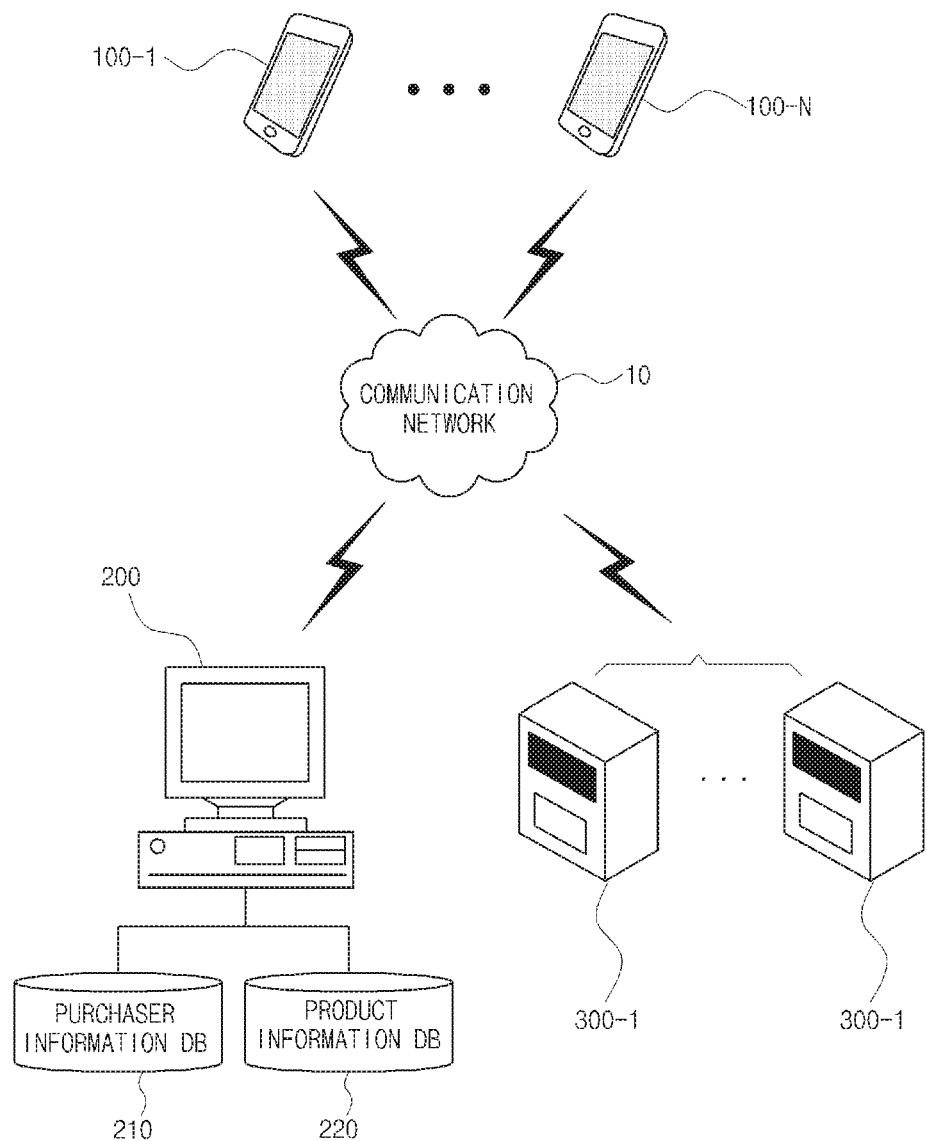
FIG. 1 is a block diagram illustrating a system for providing a product delivery service in an electronic transaction using a smartphone according to an embodiment of the present invention.

Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Like reference numerals refer to like elements throughout. As used herein, the term "and/or," includes any and all combinations of one or more of the associated listed items.

It will be understood that, although the terms first, second etc. may be used herein to describe various elements, components, and/or sections, these elements, components, and/or sections should not be limited by these terms. These terms are only used to distinguish one element, component, or section from another element, component, or section. Thus, a first element, component, or section discussed below could be termed a second element, component, or section without departing from the teachings of example embodiments.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the following description, when the detailed description of relevant known functions or configurations is determined to unnecessarily obscure the important point of the present invention, the detailed description will be omitted. Also, the terms described below are defined in consideration of the functions in the present invention, and thus may vary depending on intentions or customs of a user or operator. Accordingly, the terms will be defined based on the whole specification.

FIG. 1 is a block diagram illustrating a system for providing a product delivery service in an electronic transaction using a smartphone according to an embodiment of the present invention.

Referring to FIG. 1, a system for providing a product delivery service in an electronic transaction using a smartphone according to an embodiment of the present invention may include at least one smartphone 100-1 to 100-N, an online shopping mall server 200, and at least one delivery product discharging device 300-1 to 300-N.

Here, it will be understood that each of the smartphones 100-1 to 100-N is an open-operating-system-based phone in which a user may freely download, use, and delete a variety of desired application programs, unlike a general cell phone (namely, a feature phone), and may be a communication device including a mobile phone having a mobile office function in addition to functions such as voice/video calls, Internet data communication, etc. or any Internet phone or tablet PC which can access the Internet but does not have a voice call function.

The smartphone 100-1 to 100-N may be implemented as a smartphone with an open operating system. Examples of the open operating system include Nokia's Symbian, RIM's BlackBerry, Apple's iOS, Microsoft's Windows Mobile, Google's Android, and Samsung's Bada.

Accordingly, since the smartphones 100-1 to 100-N use an open operating system unlike a cellular phone having a closed operating system, a user may install and manage various application programs.

That is, the above-described smartphone 100-1 to 100-N basically includes a control unit, a memory unit, a screen output unit, a key input unit, a sound output unit, a camera unit, a wireless network communication module, a short-distance wireless communication module, and a battery for supplying power.

The control unit is a functional element for controlling an operation of the smartphone 100-1 to 100-N, and includes at least one process and an execution memory, which are connected with each functional element included in the smartphone 100-1 to 100-N through a bus.

The control unit controls an operation of the smartphone 100-1 to 100-N by loading at least one program code included in the smartphone 100-1 to 100-N to the execution memory through the processor, performing calculation, and delivering a result of the calculation to at least one functional element through the bus.

The memory unit is a non-volatile memory included in the smartphone 100-1 to 100-N, and stores at least one program code that is executed through the control unit and at least one data set that is used by the program code. Basically, the memory unit stores a system program code and a system data set that correspond to an operating system of the smartphone 100-1 to 100-N, a communication program code and a communication data set that process a wireless communication connection of the smartphone 101-1 to 100-N, and at least one application program code and application data set. The program code and the data set that are used to implement the present invention are also stored in the memory unit.

The screen output unit includes a screen output device (for example, a liquid crystal display (LCD) device) and an output module for driving the screen output device and is connected with the control unit through the bus to output a calculation result corresponding to a screen output among various calculation results of the control unit to the screen output device.

The key input unit includes a key input device (or a touch screen device that interoperates with the screen output unit) having at least one key button and an input module for driving the key input device and is connected with the control unit through the bus to input commands for instructing various calculations of the control unit or data that is needed for the operations of the control unit.

The sound output unit includes a speaker for outputting a sound signal and a sound module for driving the speaker and is connected with the control unit through the bus to output a calculation result corresponding to a sound output among various calculation results of the control unit through the speaker.

The sound module decodes sound data to be output through the speaker, and converts the decoded sound data into a sound signal.

The sound input unit includes a microphone for receiving a sound signal and a sound module for driving the microphone and delivers sound data that is received through the microphone to the control unit. The sound module encodes a sound signal that is received through the microphone.

The camera unit includes an optical unit, a charge coupled device (CCD), and a camera module for driving the CCD, and acquires bitmap data that is input to the CCD through the optical unit. The bitmap data may include both of still image data and moving image data.

The wireless network communication module is a communication element for connecting wireless communication, includes at least one of an antenna, an RF module, a baseband module, and a signal processing module, and is connected with the control unit through the bus to transmit a calculation result corresponding to the wireless communication among the various calculation results of the control unit, or maintain access, registration, communication, and handoff procedures of the wireless communication while receiving data through the wireless communication to transmit the received data to the control unit.

In addition, the wireless network communication module includes a mobile communication element that performs at least one of access to a mobile communication network, position registration, call processing, call connection, data communication, and a handoff according to code division multiple access (CDMA)/wideband code division multiple access (WCDMA) standards. It will be understood by a person skilled in the art that the wireless network communication module may further include a mobile Internet communication element for performing at least one of the access to mobile Internet, the position registration, the data communication, and the handoff according to IEEE 802.16 standards. However, it is apparent that the present invention is not limited to wireless communication elements that are provided by the wireless network.

The short-distance wireless communication module is configured to establish a communication session using a radio frequency signal within a certain distance as a communication medium, and may include at least one of RFID communication, Bluetooth communication, Wireless Fidelity (Wi-Fi) communication, and public radio communication in ISO 180000 series standards. In addition, the short-distance wireless communication module may be integrated with the wireless network communication module.

The smartphone 100-1 to 100-N having the above-described configuration is a terminal capable of wireless communications. Any device other than the smartphone may be applied as long as the device is a terminal that may transmit and/or receive data over a network including the Internet. That is, the smartphone 100-1 to 100-N may include at least one of a notebook PC, a tablet PC, and other portable and mobile terminals, which have a short message sending function and a network access function.

In particular, the smartphone 100-1 to 100-N according to an embodiment of the present invention downloads a shopping-mall-related application (for example, an Auction app) and a partner-company-related application (for example, a fashion company app, a delivery company app for pizza or fried chicken, a mart app, etc.) through an app store and performs a respective shopping-mall-related application service and partner-company-related application service.

In addition, the smartphone 100-1 to 100-N may check GPS information of the smartphone 100-1 to 100-N through the shopping-mall-related application service installed therein to periodically transmit location information of the purchaser to the online shopping mall server 200.

The smartphone 100-1 to 100-N may sense whether the purchaser approaches the delivery product discharging device 300-1 to 300-N designated by the purchaser through the shopping-mall-related application installed therein, display a discharging message for the delivery product purchased by the purchaser on a screen thereof when the purchaser approaches the delivery product discharging device 300-1 to 300-N designated by the purchaser, and transmit location and identification information of the purchaser to the online shopping mall server 200 when the purchaser requires discharge of the delivery product.

In addition, the smartphone 100-1 to 100-N is connected with an online shopping mall server 200 over a communication network 10. The communication network 10 is a large high-speed backbone communication network that may provide a large-scale long-distance voice and data service, and may be a next-generation wireless network, including WiFi, Wibro, Wimax, and so on, for providing the Internet or a high-speed multimedia service.

In this case, the Internet refers to an open global computer network structure that can provide several services in the TCP/IP protocol and its upper layer, that is, hypertext transfer protocol (HTTP), Telnet, file transfer protocol (FTP), domain name system (DNS), simple mail transfer protocol (SMTP), simple network management protocol (SNMP), network file service (NFS), network information service (NIS), and so on, and provides an environment in which any purchaser of the smartphone 100-1 to 100-N may access the online shopping mall server 200 to be described below. The Internet may be a wired or wireless network, and a core network that is integrated with a wired public network, a wireless mobile communication network, or a portable Internet network.

If the communication network 10 is a mobile communication network, the communication network 10 may be a synchronous mobile communication network or asynchronous mobile communication network. Examples of the asynchronous mobile communication network may include a WCDMA communication network. Although not shown, the mobile communication network may include a radio network controller (RNC). Alternatively, examples of the asynchronous mobile communication network may include a next-generation communication network such as a 3G Long Term Evolution (LTE) network and a 4G network, or an Internet protocol (IP) network based on an IP, instead of the WCDMA network. The communication network 10 serves to transfer signals and data between the smartphone 100-1 to 100-N and the online shopping mall server 200.

In addition, the smartphone 100-1 to **100-*n* may access the online shopping mall server 200 through the communication network 10 and use a transaction mediation service for various products or services of the online shopping mall server 200 according to processing of wired/wireless communication by a communication interface. A purchaser may join the online shopping mall server 200 as a member through his/her smartphone 100-1 to 100-*n*. Purchaser information that is registered by the purchaser who has joined may be stored in the purchaser information database (DB) 210 of the online shopping mall server 200**.

Furthermore, the online shopping mall server 200 functions to provide a service for purchasing products that are registered through a seller terminal (not shown) using the shopping-mall-related application service that is installed in the smartphone 100-1 to 100-N.

In particular, the online shopping mall server 200 functions to generate a unique product barcode including order-related information of the product purchased through the shopping-mall-related application service that is installed in the smartphone 100-1 to 100-N.

In this case, the unique product barcode may include, for example, order-related information including a member ID of a purchaser, a unique device number of the delivery product discharging device selected by the purchaser, and a product order number.

In particular, the online shopping mall server 200 functions to collect, from a seller of the product purchased through the smartphone 100-1 to 100-N, delivery products that have been processed for delivery by attaching unique product barcodes thereto all at once, and perform a classification and delivery processing service by delivery destination using the unique product barcodes.

In addition, the online shopping mall server 200 functions to receive the order-related information of the delivery products transmitted from the delivery product discharging device 300-1 to 300-N that will be described below and transmit a delivery completion message to the smartphone 100-1 to 100-N of the purchaser of each delivery product.

Furthermore, the online shopping mall server 200 periodically receives location information of the purchaser from the smartphone 100-1 to 100-N of the purchaser and transmits a discharging ready signal of the purchaser delivery product to a delivery product discharging device 300-1 to 300-N designated by the purchaser using the location information when the purchaser approaches the designated delivery product discharging device 300-1 to 300-N.

The online shopping mall server 200 receives the order-related information of the delivery products transmitted from each delivery product discharging device 300-1 to 300-N to transmit a delivery completion message to the shopping-mall-related application installed in the purchaser's smartphone 100-1 to 100-N of the delivery product in a push type or transmit the delivery completion message to a purchaser-member-related webpage provided in a specific webpage (for example, a main homepage for Auction) operated by the online shopping mall server 200.

The online shopping mall server receives the location and identification information of the purchaser transmitted from the purchaser's smartphone 100-1 to 100-N to transmit a delivery product number of the purchaser and a discharging instruction to the delivery product discharging device 300-1 to 300-N designated by the purchaser to discharge the delivery product of the purchaser.

The online shopping mall server 200 receives a delivery completion signal transmitted from the delivery product discharging device 300-1 to 300-N designated by the purchaser to transmit the delivery completion confirmation message to the purchaser's smartphone 100-1 to 100-N.

The online shopping mall server 200, which is a server for operating an online shopping mall over the communication network 10 to relay a product transaction between the purchaser and the seller, manages a webpage needed to operate the shopping mall such that registration of various products that the seller intends to sell may be accepted from the seller terminal over the communication network 10 and the various registered products may be provided to the purchaser's smartphone 100-1 to 100-N through a web server (not shown) connected to the communication network 10, allowing the purchaser to purchase a necessary product.

Alternatively, the online shopping mall server 200 may basically manage the webpage such that payment for the product that is selected by the purchaser from among a list of the sale products may be processed, a process required for delivery, such as notification of guidance about the paid product to the seller, may be performed to deliver the paid product to the purchaser, and delivery of the product in transit may be tracked.

The online shopping mall server 200, which is a server for operating an online shopping mall through the communication network 10 to relay a general transaction, an auction, a reverse auction, and bargaining of a product or service between a seller and a purchaser, accepts registration of various products or services that the seller intends to sell from the seller terminal through the communication network 10 and provides the various registered products or services to the purchaser's smartphone 100-1 to 100-N through the communication network 10, thus allowing the purchaser to purchase a necessary product or service.

A web server of the online shopping mall server 200 functions to connect the online shopping mall server 200 with the purchaser's smartphone 100-1 to 100-N through the communication network 10 and to provide a variety of web services of the online shopping mall server 200 through a specific webpage.

The purchaser information DB 210 included in the online shopping mall server 200 is a DB for recording and managing purchaser information, for example, a purchaser ID, a password, contact information, cart information, product information about a product being bid on, product information about a product for which bidding has concluded, product information about a bargained product, product information about a paid product, delivery information, purchase decision information, product information of a favorite shop, and so on, which is registered by the joined purchaser and which may be read or updated to new purchaser information by the online shopping mall server 200.

In addition, the product information DB 220 included in the online shopping mall server 200 is a DB for recording information about various sale products, which may be read or updated to new sale product information by the online shopping mall server 200.

The above-described DBs 210 and 220 may be implemented for the purpose of the present invention using a relational database management system (RDBMS), such as Oracle, Infomix, Sybase, and DB2, and an object-oriented database management system (OODBMS), such as Gemstone, Orion, and O2, and configured to have a field suitable for accomplishing its function.

In addition, in this specification, the term DB may mean a functional and structural combination of hardware and software, which stores information corresponding to respective databases. The DB may be implemented as at least one table and further include a separate database management system (DBMS) for retrieving, storing, and managing information that is stored in a database.

In addition, the DB may be implemented in various manners such as a linked-list, a Tree, and a relational database, and includes all data storage media and data structures that may store information corresponding to the database.

The delivery product discharging device 300-1 to 300-N functions to scan the unique product barcodes of the delivery products processed for delivery by the online shopping mall server 200 and to transmit order-related information of each delivery product to the online shopping mall server 200.

In addition, the delivery product discharging device 300-1 to 300-N may be installed in a specific place, for example, in a subway station or a bus stop, to discharge the delivery product of the purchaser through the shopping-mall-related application service installed in the smartphone 100-1 to 100-N.

Furthermore, the delivery product discharging device 300-1 to 300-N may transmit a specific beacon signal to the shopping-mall-related application installed in the purchaser's smartphone 100-1 to 100-N and transmit the location information of the purchaser to the online shopping mall server 200 based on the specific beacon signal transmitted from the delivery product discharging device 300-1 to 300-N through the shopping-mall-related application service installed in the purchaser's smartphone 100-1 to 100-N.

The delivery product discharging device 300-1 to 300-N may receive the delivery product number of the purchaser and the discharging instruction transmitted from the online shopping mall server 200 to provide a service for discharging the delivery product of the purchaser and transmit a delivery completion signal to the online shopping mall server 200 after completion of discharge of the delivery product.

The system may include at least one Bluetooth transmitter (not shown) installed a certain distance from the delivery product discharging device 300-1 to 300-N and configured to output a specific beacon signal. When the specific beacon signal output from the Bluetooth transmitter is sensed through the shopping-mall-related application service installed in the purchaser's smartphone 100-1 to 100-N, the purchaser's smartphone 100-1 to 100-N may transmit detailed location information of the purchaser to the delivery product discharging device 300-1 to 300-N designated by the purchaser and the online shopping mall server 200.

Additionally, the purchaser's smartphone 100-1 to 100-N may transmit the location information of the purchaser to the delivery product discharging device 300-1 to 300-N designated by the purchaser using the shopping-mall-related application service installed therein, and the delivery product discharging device 300-1 to 300-N designated by the purchaser may periodically receive the location information of the purchaser transmitted from the purchaser's smartphone 100-1 to 100-N and perform discharge preparation by computing a moving time for each means of transport and determining an order in which the delivery products are discharged such that the delivery product of the purchaser that arrives at the delivery product discharging device 300-1 to 300-N soonest may be discharged first.

The delivery product discharging device 300-1 to 300-N may be implemented similar to a typical vending machine and configured such that a delivery product packed in a standardized box is inserted and discharged.

A method of providing a product delivery service in an electronic transaction using a smartphone according to an embodiment of the present invention will be described in detail below.

Figure 2:
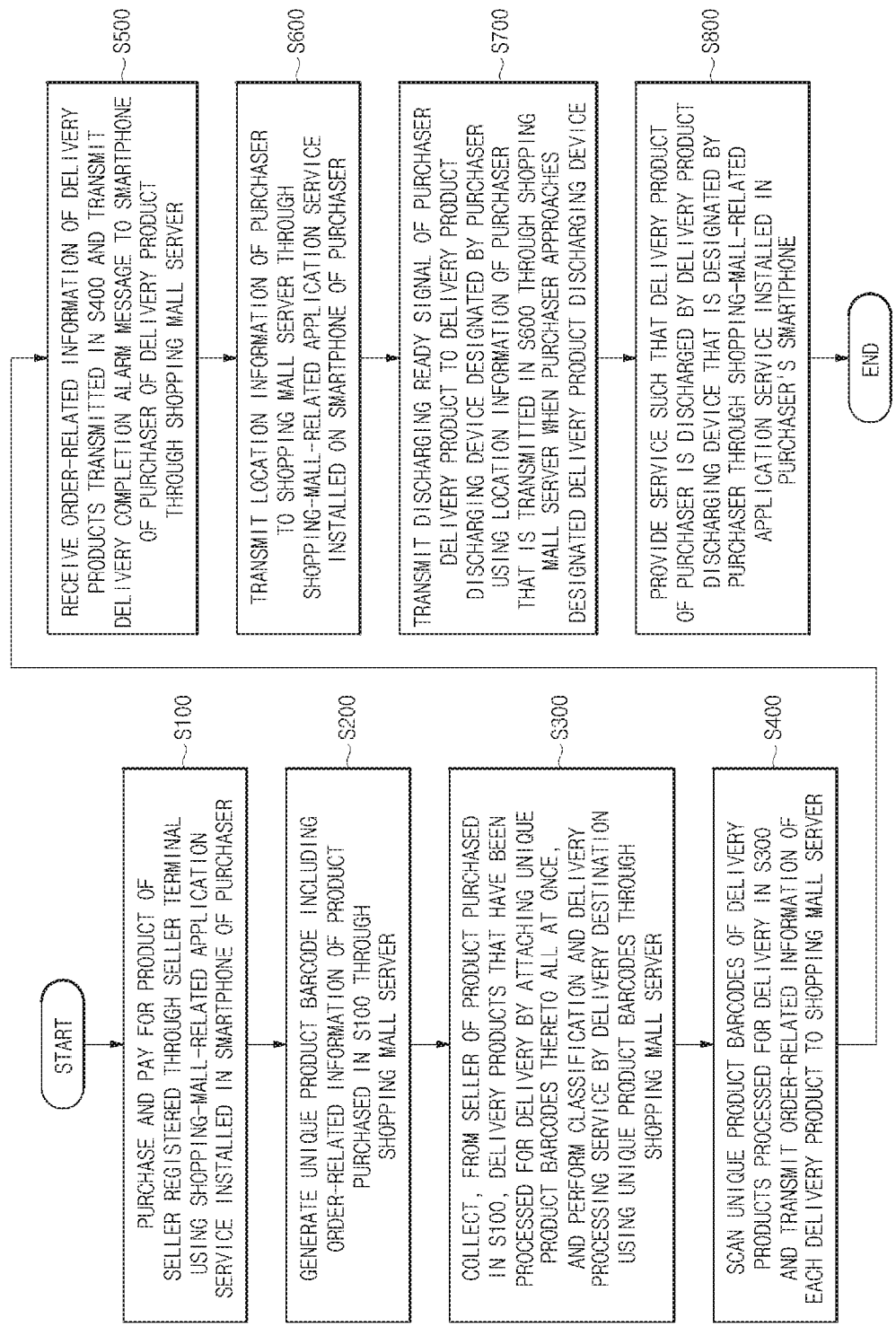
FIG. 2 is a flowchart illustrating a method of providing a product delivery service in an electronic transaction using a smartphone according to an embodiment of the present invention.

FIG. 2 is a flowchart illustrating a method of providing a product delivery service in an electronic transaction using a smartphone according to an embodiment of the present invention.

Referring to FIGS. 1 and 2, first, a purchaser purchases and pays for a product of a seller registered through a seller terminal using a shopping-mall-related application service installed in a smartphone 100-1 to 100-N of the purchaser (S100).

In this case, the purchaser selects a product delivery method, for example, a delivery product discharging system scheme, and designates a delivery product discharging device installed in a subway station or a bus stop that the purchaser uses frequently.

Subsequently, the online shopping mall server 200 generates a unique product barcode including order-related information of the product purchased in S100 (S200) and then transmits the generated unique product barcode to a seller terminal of a seller of the product that is purchased in S100.

In this case, the unique product barcode generated in S200 may include, for example, order-related information including a member ID of a purchaser, a unique device number of the delivery product discharging device selected by the purchaser, and a product order number.

Next, the seller packs the product purchased in S100 into a standardized box, prints the unique product barcode transmitted from the online shopping mall server 200 in a sticker form, attaches the unique product barcode to the packed box, and delivers the box having the unique product barcode attached thereto to a central warehouse that is operated by the online shopping mall server 200.

Subsequently, the online shopping mall server 200 collects, from the seller of the product purchased in S100, delivery products that have been processed for delivery by attaching unique product barcodes thereto all at once, and performs a classification and delivery processing service by delivery destination (that is, delivery product discharging device) using the unique product barcodes (S300).

Next, the delivery product discharging device 300-1 to 300-N sequentially stacks the delivery products that are processed for delivery and inserted in S300, similarly to a vending machine, scans unique product barcodes of the inserted delivery products, and transmits order-related information of each delivery product to the online shopping mall server 200 (S400).

Next, the online shopping mall server 200 receives the order-related information of the delivery products transmitted in S400 and transmits a delivery completion message for informing that the delivery has been completed to the purchaser's smartphone 100-1 to 100-N of each delivery product (S500), In this case, the online shopping mall server 200 receives the order-related information of the delivery products transmitted in S400 to transmit a delivery completion message to the shopping-mall-related application installed in the purchaser's smartphone 100-1 to 100-N of the delivery product in a push type or transmit the delivery completion message to a purchaser-member-related webpage provided in a specific webpage operated by the online shopping mall server 200.

Subsequently, the purchaser's smartphone 100-1 to 100-N may check GPS information thereof through the shopping-mall-related application service installed therein to periodically transmit location information of the purchaser to the online shopping mall server 200 (S600).

In this case, the location information of the purchaser need not always be transmitted and may be transmitted when a GPS location of the purchaser approaches the delivery product discharging device 300-1 to 300-N.

Alternatively, instead of the GPS information of the smartphone, the location information of the purchaser may be implemented by applying a Beacon technique of a Bluetooth transmitter, thus transmitting accurate location information of the purchaser including a basement or a floor in a building.

That is, the delivery product discharging device 300-1 to 300-N may transmit a specific beacon signal to the shopping-mall-related application installed in the purchaser's smartphone 100-1 to 100-N when the purchaser approaches the delivery product discharging device 300-1 to 300-N and transmit the location information of the purchaser to the online shopping mall server 200 based on the specific beacon signal transmitted through the shopping-mall-related application service installed in the purchaser's smartphone 100-1 to 100-N.

Next, the online shopping mall server 200 transmits a discharging ready signal of the purchaser delivery product to the delivery product discharging device 300-1 to 300-N designated by the purchaser using the location information of the purchaser that is transmitted in S600 when the purchaser approaches the designated delivery product discharging device 300-1 to 300-N (S700).

Subsequently, the purchaser's smartphone 100-1 to 100-N provides a service such that the delivery product of the purchaser may be discharged by the delivery product discharging device 300-1 to 300-n that is designated by the purchaser through the shopping-mall-related application service installed in the purchaser's smartphone 100-1 to 100-N (S800).

That is, the purchaser's smartphone 100-1 to 100-N senses whether the purchaser approaches the delivery product discharging device 300-1 to 300-N designated by the purchaser through the shopping-mall-related application installed therein, displays a discharging message for the delivery product purchased by the purchaser on a screen thereof when the purchaser approaches the delivery product discharging device 300-1 to 300-N designated by the purchaser, and transmits location and identification information of the purchaser to the online shopping mall server 200 when the purchaser requires discharge of the delivery product.

Subsequently, the shopping mall server transmits a delivery product number of the purchaser and a discharging instruction to the delivery product discharging device 300-1 to 300-N designated by the purchaser such that the delivery product of the purchaser may be discharged using the location and identification information of the purchaser transmitted from the purchaser's smartphone 100-1 to 100-N.

Next, the delivery product discharging device 300-1 to 300-N designated by the purchaser provides a service such that the delivery product of the purchaser is discharged using the delivery product number of the purchaser and the discharging instruction transmitted from the online shopping mall server 200. The delivery is completed by the purchaser taking the discharged delivery product. The delivery product discharging device 300-1 to 300-N transmits the delivery completion signal to the online shopping mall server 200 when the discharge of the delivery product is completed.

Next, the online shopping mall server 200 transmits the delivery completion confirmation message to the purchaser's smartphone 100-1 to 100-N in order to prevent erroneous delivery based on the delivery completion signal transmitted from the delivery product discharging device 300-1 to 300-N designated by the purchaser.

When the delivery product discharging device has many orders and many products to be discharged, a space for finding the delivery product may be limited and it may take time to find the delivery product to be discharged. In order to solve the problems, the delivery product discharging device 300-1 to 300-N may previously perform preparation by utilizing GPS and Beacon technologies.

That is, after S500, the purchaser's smartphone 100-1 to 100-N may check GPS information of the smartphone 100-1 to 100-N and transmit the location information of the purchaser to the delivery product discharging device 300-1 to 300-N designated by the purchaser using the shopping-mall-related application service installed therein, and the delivery product discharging device 300-1 to 300-N designated by the purchaser may periodically receive the location information of the purchaser transmitted from the purchaser's smartphone 100-1 to 100-N and perform discharging preparation by computing a moving time for each means of transport and determining an order in which the delivery products are discharged such that the delivery product of the purchaser that arrives at the delivery product discharging device 300-1 to 300-N soonest may be discharged first.

At least one Bluetooth transmitter (not shown) that outputs a specific beacon signal is installed a certain distance from the delivery product discharging device 300-1 to 300-N. When the specific beacon signal output from the Bluetooth transmitter is sensed through the shopping-mall-related application service installed in the purchaser's smartphone 100-1 to 100-N, the purchaser's smartphone 100-1 to 100-N may transmit detailed location information of the purchaser to the delivery product discharging device 300-1 to 300-N designated by the purchaser and/or the online shopping mall server 200.

A method of delivering a product in an electronic transaction using a smartphone according to another embodiment of the present invention such that a transaction between an individual seller and a purchaser may be easy will be described below in detail.

First, like S100 described above, a purchaser purchases and pays for a product of a seller registered through a seller terminal using a shopping-mall-related application service installed in a smartphone 100-1 to 100-N of the purchaser.

Subsequently, the online shopping mall server 200 generates a unique product barcode including order-related information of the purchased product and then transmits the generated unique product barcode to a delivery product discharging device 300-1 to 300-N that is designated by the purchaser. Also, the online shopping mall server 200 transmits the order-related information of the purchased product to a terminal of a seller corresponding to the purchased product.

Next, the seller checks the order-related information of the purchased product that is transmitted to the seller terminal, packs the purchased product into a standardized box, and inserts the box into the delivery product discharging device 300-3 to 300-N that is designated by the purchaser.

In this case, the seller enters a product order number among the checked order-related information into the delivery product discharging device 300-1 to 300-N, and the delivery product discharging device 300-1 to 300-N compares the entered product order number with the order-related information of the unique product barcode transmitted from the online shopping mall server 200, issues a unique product barcode corresponding to the product order number in a sticker form, and attaches the unique product barcode to the box inserted by the seller.

Subsequently, the delivery product discharging device 300-1 to 300-N designated by the purchaser transmits a delivery completion message for informing that the delivery has been completed to the purchaser's smartphone 100-1 to 100-N corresponding to the delivery product having the unique product barcode attached thereto.

Next, a process of the purchaser finding the delivery product that is contained in the delivery product discharging device 300-1 to 300-N may be the same as that of the embodiment of the present invention described above. However, the function of the online shopping mall server 200 may instead be performed by the delivery product discharging device 300-1 to 300-N.

When a specific beacon signal transmitted from a Bluetooth transmitter of the delivery product discharging device 300-1 to 300-N designated by the purchaser is sensed through a shopping-mall-related application service installed in the purchaser's smartphone 100-1 to 100-N, the purchaser additionally transmits identification information (for example, a photograph, a phone number, a member ID, or a nickname of the purchaser) that is previously registered by the purchaser to the online shopping mall server 200.

Subsequently, the online shopping mall server 200 may receive the identification information that is additionally transmitted from the purchaser's smartphone 100-1 to 100-N and transmit the identification information to the delivery product discharging device 300-1 to 300-N designated by the purchaser.

Next, the delivery product discharging device 300-1 to 300-N designated by the purchaser may provide a service such that the delivery product of the purchaser may be safely and quickly discharged using the location information of the purchaser and the identification information transmitted from the online shopping mall server 200.

If the purchaser wishes to return the delivery product that he/she has purchased, the purchaser inserts the delivery product having the unique product barcode attached thereto into the delivery product discharging device 300-1 to 300-N designated by the purchaser or another delivery product discharging device in a return form, and the delivery product discharging device 300-1 to 300-N stacks the box inserted in the return form on a return container.

Subsequently, when the online shopping mall server 200 performs a delivery processing service, return products stacked on the return container of the delivery product discharging device 300-1 to 300-N are collected all at once to allow the seller to perform return delivery processing. Alternatively, the delivery product discharging device 300-1 to 300-N scans the unique product code of the box inserted in the return form and then transmits a return completion message to the seller terminal such that the seller may directly collect the returned product. Subsequently, the seller takes the return-processed product from the delivery product discharging device 300-1 to 300-N.

With the system and method for providing a product delivery service in an electronic transaction using a smartphone according to an embodiment of the present invention, delivery product discharging devices are suitably disposed in specific places of main areas such as a subway station or a bus stop and a purchaser may conveniently pick up an ordered delivery product from a delivery product discharging device previously designated by the purchaser using his/her smartphone, without waiting for the delivery.

While the preferred embodiments of the system and method for providing a product delivery service in an electronic transaction using a smartphone have been described, the present invention is not limited thereto, various modifications may be made therein, and the appended claims are intended to cover all such modifications which may fall within the spirit and scope of the invention.

What is claimed is:

1. A system for providing a product delivery service through an electronic transaction using a smartphone configured to perform a shopping-mall-related application service, the system comprising:
    a shopping mall server configured to:
        generate a unique product barcode provided to order a product registered through a seller terminal using the shopping-mall-related application service in response to a purchaser ordering the product, the unique product barcode including order-related information for the ordered product;
        receive data indicating that delivery products including the ordered product have been obtained, from a seller of the ordered product, the delivery products being processed for delivery by attaching unique product barcodes thereto to perform a classification and delivery processing service by delivery destination using the unique product barcodes;

communicate with a device that is co-located with the delivery products and that is installed in a specific place to make the delivery products available for pickup by respective purchasers through the shopping-mall-related application service, wherein the device that is co-located with the delivery products is configured to transmit a specific signal to the shopping-mall-related application service installed in a smartphone of the purchaser;

receive order-related information of the delivery products from the device that is co-located with the delivery products;

transmit a delivery completion message to the purchaser smartphone of the purchaser of the ordered product indicating that the ordered product has been processed for delivery;

receive, from the purchaser smartphone of the purchaser, location information of the purchaser, wherein the location information is received based on the specific signal;

transmit, when the purchaser approaches the device that is co-located with the ordered product, using the location information of the purchase, an instruction for making the ordered product available for pickup by the purchaser to the device that is co-located with the delivery products.

2. The system of claim 1, wherein the device that is co-located with the delivery products contains the delivery products, and wherein the unique product barcode includes order-related information including a member ID of the purchaser, a unique device number of the device that contains the delivery products that has been designated by the purchaser, and a product order number.

3. The system of claim 1, wherein the shopping mall server receives the order-related information of the delivery products transmitted from the device that is co-located with the delivery products to transmit the delivery completion message to the shopping-mall-related application installed in the purchaser smartphone of the ordered product in a push type manner or transmit the delivery completion message to a purchaser-member-related webpage provided in a specific webpage operated by the shopping mall server.

4. The system of claim 1, wherein the smartphone checks GPS information of the smartphone through the shopping-mall-related application service to periodically transmit location information of the purchaser to the shopping mall server.

5. The system of claim 1, wherein the location information is received at the shopping mall server through the device that is co-located with the delivery products.

6. The system of claim 1,
wherein the purchaser smartphone senses whether the purchaser approaches the device that is co-located with the delivery products designated by the purchaser through the shopping-mall-related application installed in the smartphone, displays a discharging message for the ordered product on a screen thereof when the purchaser approaches the device that is co-located with the delivery products designated by the purchaser, and transmits location and identification information of the purchaser to the shopping mall server when the purchaser requires that the ordered product be made available for pickup, and wherein the shopping mall server receives the location and identification information of the purchaser transmitted from the smartphone to transmit a delivery product number of the purchaser and a discharging instruction to the device designated by the purchaser.

7. The system of claim 6,
wherein the device designated by the purchaser receives the delivery product number of the purchaser and the discharging instruction transmitted from the shopping mall server to provide a service for making the ordered product available for pickup by the purchaser and transmits a delivery completion signal to the shopping mall server, and wherein the shopping mall server receives the delivery completion signal transmitted from the device designated by the purchaser to transmit the delivery completion confirmation message to the purchaser smartphone.

8. The system of claim 1, wherein the purchaser smartphone transmits the location information of the purchaser to the device designated by the purchaser using the shopping-mall-related application service of the smartphone.

9. The system of claim 8, further comprising at least one Bluetooth transmitter installed a certain distance from the device that is co-located with the delivery products and configured to output a specific beacon signal, wherein, when the specific beacon signal output from the Bluetooth transmitter is sensed through the shopping-mall-related application service of the smartphone, the purchaser smartphone transmits detailed location information of the purchaser to the device designated by the purchaser and the shopping mall server.

10. The system of claim 1, wherein the device that is co-located with the delivery products is installed in a specific place in a subway station or a bus stop.

11. A method of providing a product delivery service through an electronic transaction using a system including a smartphone connected with a shopping mall server and at least one device that is co-located with delivery products over a communication network, the method comprising:

(a) ordering a product registered through a seller terminal using a shopping-mall-related application service installed in the smartphone;

(b) generating a unique product barcode including order-related information of the ordered product through the shopping mall server and receiving data indicating that delivery products including the ordered product have been obtained from a seller of the ordered product, the delivery products being processed for delivery by attaching unique product barcodes thereto, to perform a classification and delivery processing service by delivery destination using the unique product barcodes;

(c) communicating, by the shopping mall server, with the device that is co-located with the delivery products and that is installed in a specific place to make the delivery of products available for pickup by respective purchasers through the shopping-mall-related application service, wherein the device that is co-located with the delivery products transmits a specific signal to the shopping-mall-related application service installed in a smartphone of the purchaser;

(d) receiving, by the shopping mall server, the order-related information of the delivery products from the device that is co-located with the delivery products and transmitting a delivery completion message to the purchaser smartphone of the purchaser of the ordered product indicating that the ordered product has been processed for delivery;

(e) receiving, by the shopping mall server from the purchaser smartphone of the purchaser, location information of the purchase, wherein the location information is received based on the specific signal; and (f) transmitting, by the shopping mall server when the purchaser approaches the device that is co-located with the ordered product, using the location information of the purchaser, an instruction for making the ordered product available for pickup by the purchaser to the device that is co-located with the delivery products that has been designated by the purchaser.

12. The method of claim 11, wherein the device that is co-located with the delivery products contains the delivery products, and wherein the unique product barcode includes order-related information including a member ID of the purchaser, a unique device number of the device that is co-located with the delivery products that has been designated by the purchaser, and a product order number.

13. The method of claim 11, wherein the shopping mall server receives the order-related information of the delivery products transmitted from the device that is co-located with the delivery products to transmit a delivery completion message to the shopping-mall-related application installed in the purchaser smartphone of the delivery product in a push type manner or transmit the delivery completion message to a purchaser-member-related webpage provided in a specific webpage operated by the shopping mall server.

14. The method of claim 11, wherein the smartphone checks GPS information of the smartphone through the shopping-mall-related application service to periodically transmit location information of the purchaser to the shopping mall server.

15. The method of claim 11, wherein the location information is received at the shopping mall server through the device that is co-located with the delivery products.

16. The method of claim 11, wherein the purchaser smartphone senses whether the purchaser approaches the device that is co-located with the deliver products designated by the purchaser through the shopping-mall-related application installed in the smartphone, displays a discharging message for the ordered product on a screen thereof when the purchaser approaches the device that is co-located with the delivery products designated by the purchaser, and transmits location and identification information of the purchaser to the shopping mall server when the purchaser requires that the ordered product be made available for pickup, and the shopping mall server transmits a delivery product number of the purchaser and a discharging instruction to the device that is co-located with the delivery products designated by the purchaser.

17. The method of claim 16, wherein the device that is co-located with the deliver products designated by the purchaser provides a service for making the ordered product available for pickup by the purchaser using the delivery product number of the purchaser and the discharging instruction transmitted from the shopping mall and transmits a delivery completion signal to the shopping mall server, and the shopping mall server transmits the delivery completion confirmation message to the purchaser smartphone based on the delivery completion signal transmitted from the device designated by the purchaser.

18. The method of claim 11, further comprising transmitting the location information of the purchaser to the device designated by the purchaser using the shopping-mall-related application service of the smartphone, periodically receiving the location information of the purchaser transmitted from the purchaser smartphone through the device designated by the purchaser, and performing discharging preparation by computing a moving time for each means of transport and determining an order in which the delivery products are made available for pickup such that the ordered product arrives at the device in a shortest time is discharged first.

19. The method of claim 18, wherein at least one Bluetooth transmitter for outputting a specific beacon signal is installed a certain distance from the device that is co-located with the delivery products, and when the specific beacon signal output from the Bluetooth transmitter is sensed through the shopping-mall-related application service of the smartphone, the purchaser smartphone transmits detailed location information of the purchaser to the device designated by the purchaser and the shopping mall server.

20. The method of claim 11, further comprising installing the device that is co-located with the delivery products in a specific place in a subway station or a bus stop.

* * * * *